UNITED STATES PATENT OFFICE.

CATHCART THOMSON, OF HALIFAX, NOVA SCOTIA, CANADA.

PROCESS OF PRESERVING FISH.

SPECIFICATION forming part of Letters Patent No. 391,436, dated October 23, 1888.

Application filed December 27, 1887. Serial No. 259,132. (No specimens.)

*To all whom it may concern:*

Be it known that I, CATHCART THOMSON, a British subject, residing at Halifax, Nova Scotia, Canada, have invented a new and useful Improvement in Preserving and Putting Up Salted Cod-Fish and Fish of Similar Character, of which the following is a specification.

My invention relates to improvements in the process of preserving salted cod-fish and similar fish, and is performed in the following manner: After the fish has been split and salted in the usual way and the skins and bones removed, as is done in preparing "boneless fish," it is cooked either by being steamed or boiled. The former is preferable. It is then in an evenly-spread layer placed under a press (the layers are better not to exceed three inches in thickness) and sufficient pressure applied to force out at least twenty-five per cent. of the moisture the fish contains. The result of this pressure is to form the fish into a comparatively dry cake, which is then put up in waxed or varnished paper packages and hermetically sealed, so as to exclude all air and moisture. Fish treated in this manner will be preserved for any length of time and in any climate.

Should the fish to be thus preserved be intended to be used for "fish hashes" or "fish-balls," it may be finely shredded, which may be done by pounding or any other convenient method before being pressed.

I am aware of the process described in Letters Patent No. 204,966 for compressing uncooked fish for the purpose of expelling the surplus brine or water. Such compression will but to a very slight degree effect such a result.

In carrying out my process the fish must first be cooked. This entirely changes the character of the flesh, which then becomes firm, thus enabling the moisture to be readily expelled by pressure.

What I claim as my invention is—

The pressing cooked fish to force out the moisture and putting the compressed fish in waxed or varnished paper packages, so as to exclude all air and moisture, as substantially set forth in the foregoing specification.

CATHCART THOMSON.

Witnesses:
F. LE PAGE,
FREDERICK SUMMERS.